H. S. WILLCOX.
HAY RACK.
APPLICATION FILED OCT. 7, 1913.

1,093,304.

Patented Apr. 14, 1914.
3 SHEETS—SHEET 1.

Witnesses

Inventor
Harry S. Willcox
By Victor J. Evans
Attorney

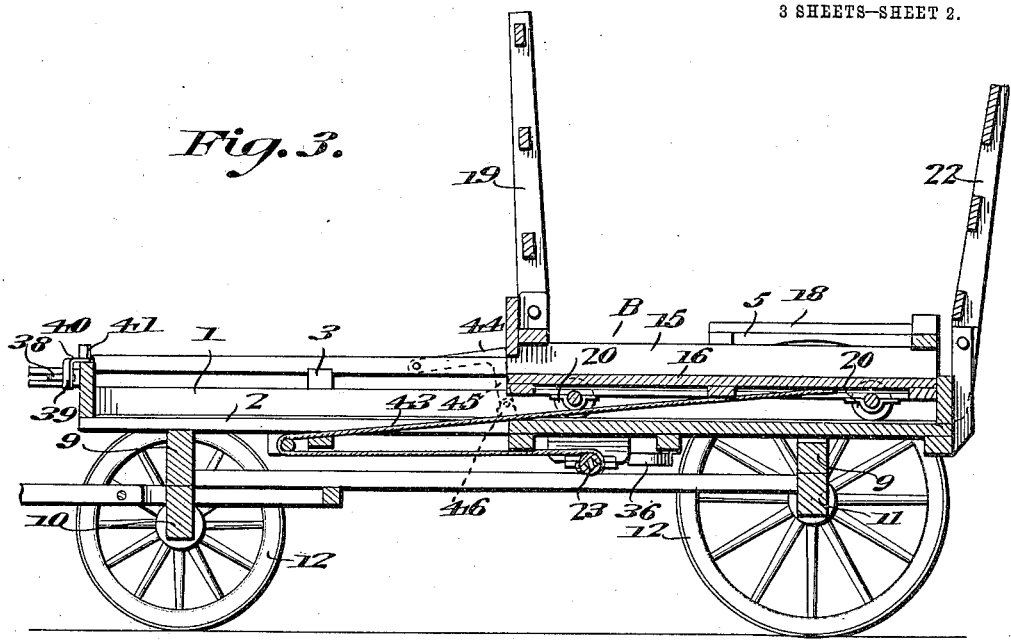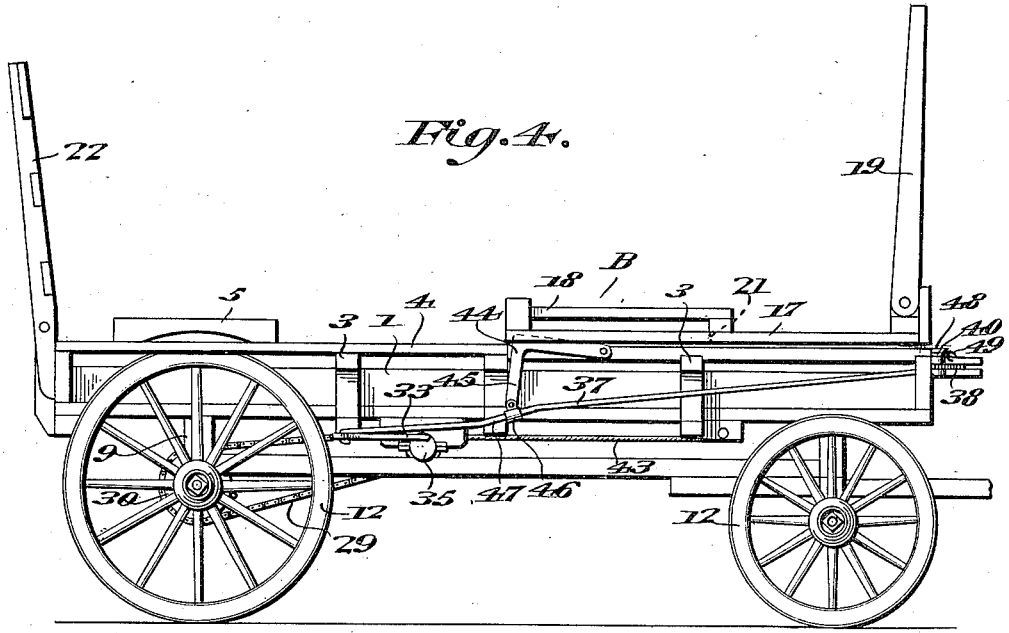

H. S. WILLCOX.
HAY RACK.
APPLICATION FILED OCT. 7, 1913.
1,093,304.
Patented Apr. 14, 1914.
3 SHEETS—SHEET 3.
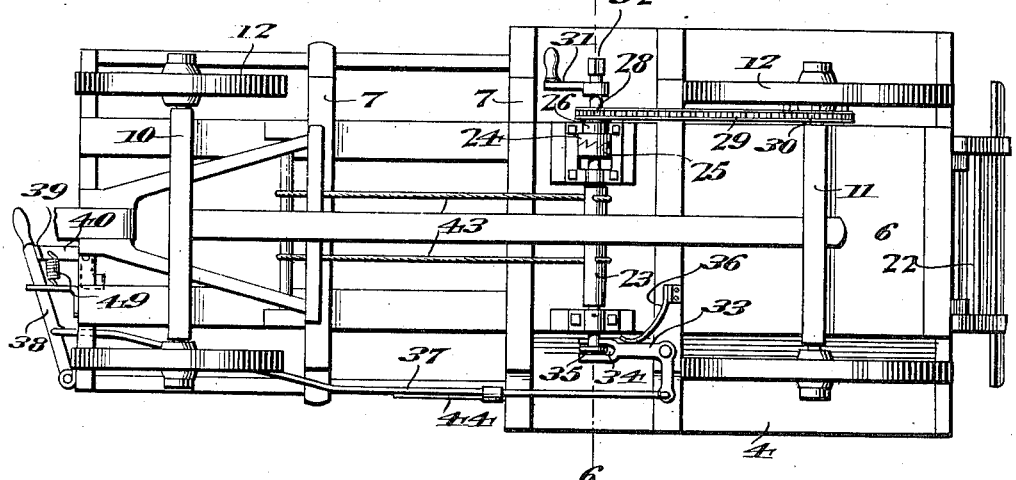
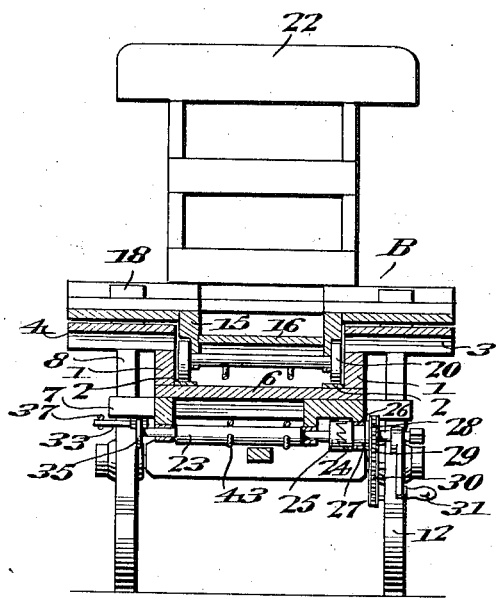
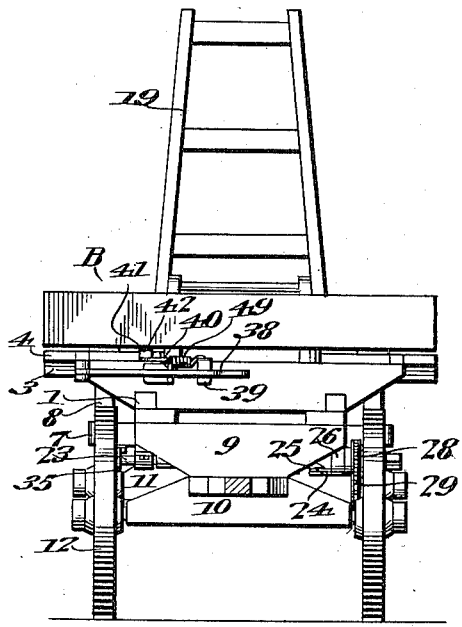
Witnesses
Inventor
Harry S. Willcox
By Victor J. Evans
Attorney

UNITED STATES PATENT OFFICE.

HARRY S. WILLCOX, OF OXFORD, NEW YORK.

HAY-RACK.

1,093,304.  Specification of Letters Patent.  Patented Apr. 14, 1914.

Application filed October 7, 1913. Serial No. 793,941.

*To all whom it may concern:*

Be it known that I, HARRY S. WILLCOX, a citizen of the United States, residing at Oxford, in the county of Chenango and State of New York, have invented new and useful Improvements in Hay-Racks, of which the following is a specification.

This invention relates to hay racks, and it has particular reference to an improved hay rack adapted to be used in connection with hay loaders.

In case of a hay rack coöperating with a hay loader for the purpose of receiving the load, it is customary to place an operator on the rack for the purpose of distributing the load so that it may be placed evenly on the rack.

The principal object of the present invention is to dispense with this hard and disagreeable work by producing a hay rack of simple and improved construction having a movable platform which may receive a portion, approximately one-half of the load, after which said platform may be moved lengthwise of the rack to provide an open space for the reception of the remainder of the load.

A further object of the invention is to produce a hay rack having a movable platform of a simple and improved construction which, having received its load, may be moved lengthwise of the rack by power derived from one of the transporting wheels.

A further object of the invention is to produce a device of the character described, wherein the transmission of motion shall be automatically suspended at the proper time when the loaded platform has reached the limit of its movement.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
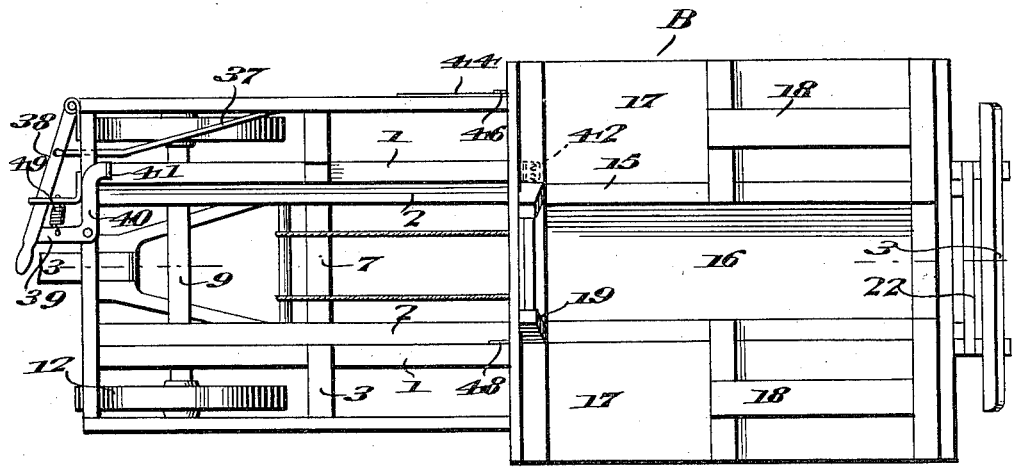
Figure 2:
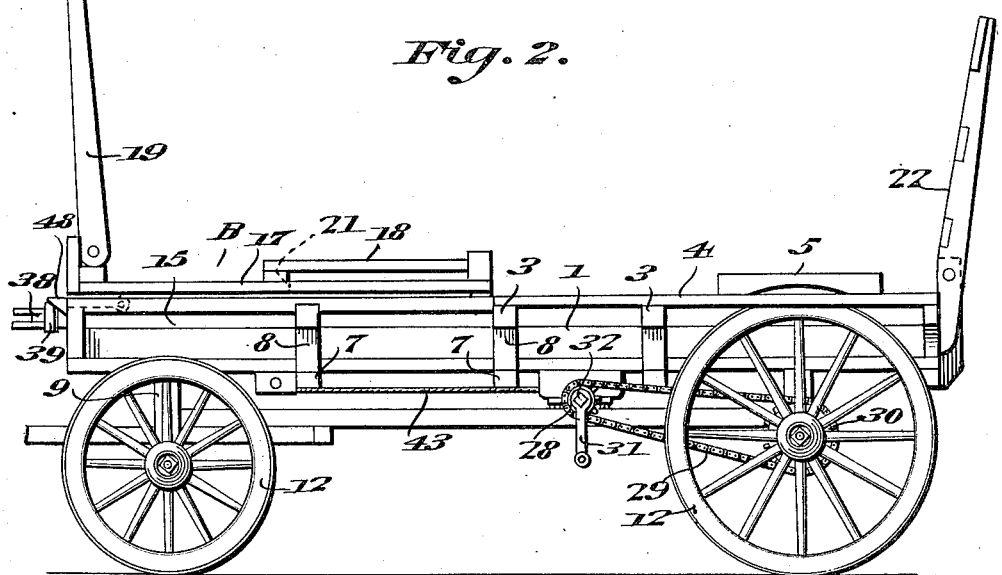

In the drawings, Figure 1 is a top plan view of a hay rack constructed in accordance with the invention, and showing the movable platform in load receiving position. Fig. 2 is a side elevation showing the loaded platform transferred to the forward end of the rack. Fig. 3 is a longitudinal vertical sectional view taken on the line 3—3 in Fig. 1. Fig. 4 is a side elevation, showing the parts relatively arranged as in Fig. 2. Fig. 5 is a bottom plan view. Fig. 6 is a transverse sectional view taken on the line 6—6 in Fig. 5. Fig. 7 is a front elevation.

Corresponding parts in the several figures are denoted by like characters of reference.

The frame of the hay rack comprises the longitudinal sills 1 adjacent to the inner faces of which longitudinal rails or track members 2 are arranged. The sills support the brackets 3 on which the sideboards 4 are mounted, said sideboards having the wheel guards 5. It will be observed that the sideboards extend only approximately one-half the length of the sills at the rear end thereof to coincide with the length of the bottom member 6 which also extends only approximately one-half the length of the rack. The sills are supported on cross bars 7 which extend beyond the sills and which carry struts 8 to assist in supporting the brackets 3. The frame structure is supported on bolsters 9 mounted on the front and rear axles 10, 11 having transporting wheels 12.

A movable platform B is provided, said platform being of a length approximately equal to one-half of the rack, said platform comprising in its construction sills 15, a bottom member 16, sideboards 17 having wheel guards 18, and a hay ladder 19 which is hingedly supported adjacent to the front end of the platform. The platform is provided with wheels 20 adapted to travel on the rails or track members 2. The sideboards are provided directly beneath the wheel guards 18 with slots 21 to accommodate the wheel guards 5 associated with the sideboards 4 when the platform is positioned at the rearward end of the rack. The rack, it will be observed, is provided at the rear end thereof with a hingedly supported hay ladder 22.

Supported for rotation in bearings on the undersides of the sills 1 is a drum shaft 23 carrying a clutch member 24 which by sliding the shaft in the direction of its length may be placed in or out of engagement with a clutch collar 25 which is supported for rotation on the shaft, but which is held against movement longitudinally by a portion of the bearing member 26 which engages an annular groove 27 in said collar. The clutch collar carries a sprocket 28 which is connected by a chain 29 with a sprocket wheel 30 on one of the hind wheels 12 of the rack. It will be noted that when the clutch member 25 is disengaged from the clutch collar 24, the latter may rotate freely about the shaft, while by moving the shaft longitudinally to place the clutch members in engagement, the shaft will be rotated by the clutch. The shaft may be rotated independently of the clutch by means of a crank handle 31 which is pivoted on the shaft, but which may be connected therewith by a clutch device 32 so as to permit the shaft to be rotated independently of the clutch formed by the members 24, 25 when the rack is standing still.

For the purpose of moving the shaft 23 lengthwise to place the clutch member 24 in or out of engagement with the clutch collar 25, a shipping lever is provided which consists of an angular lever 33 pivoted on the frame of the rack, one arm of said lever having a slot 34 which engages an annular flange or collar 35 on the shaft 23, which latter, by rocking the lever, may be moved in the direction of its length. A spring 36 engages one arm of the shipping lever and serves to hold the clutch members 24, 25 normally out of engagement. Pivotally connected with the other arm of the shipping lever is one end of a connecting rod 37 which extends forwardly and the other end of which is connected with a hand lever 38 fulcrumed on the forward end of the hay rack. By pulling the hand lever 38 in a forward direction, the shipping lever will be actuated against the tension of the spring 36 to slide the shaft 23 in the direction of its length so as to place the clutch members 24, 25 in engagement. The hand lever, when pulled forwardly, may be retained in position by means of a stop member 39 extending from one arm of a bell crank 40, the other arm of which has an upwardly extending obstructing member 41 lying in the path of the movable platform B, which latter may be equipped with an engaging member or lip 42 to engage the obstructing member 41.

The platform B is connected with the drum shaft 23 by means of flexible elements, such as cables 43, having one end connected with the underside of the platform near the rear end of the latter, the other ends of said cables being connected with and adapted to be wound on the drum shaft. For the purpose of maintaining the platform B in retracted position at the rear end of the rack a stop member is provided consisting of a bar or lever 44 which is pivoted on one side of the rack so as to be capable of lying in the path of and thus obstructing the forward movement of the platform B when the latter is retracted. The bar 44 has a downwardly extending arm 45 provided with a terminal sleeve 46 through which the connecting rod 37 is guided, said rod having an offset portion 47 engaging the sleeve and constituting a cam which, by the forward movement of the connecting rod, will serve to move the bar or stop member 44 to a non-obstructing position with respect to the movable platform. The latter is also provided with a pivoted gravity catch 48 which when the platform reaches the forward limit of its movement will automatically engage the front portion of the rack, thereby retaining the platform against rearward or retracting movement.

In the operation of this device, the improved hay rack is so positioned with relation to a hay loading device of conventional construction that the hay discharged from such loader will be received on the platform B when the latter is in retracted position. It will be observed that the hay will be received on the platform between the hay ladders 22 and 19, thus enabling a full load to be built up on the platform. When the platform has been fully loaded the operator by manipulating the hand lever 38 actuates the shipping lever to move the drum shaft until the clutch members 24 and 25 are in engagement, the hand lever being retained in position so as to hold the shipping lever against the tension of the spring 36 by means of the stop member 39 depending from the bell crank 40, which latter is thrown in engagement with the hand lever by the action of a spring 49. The forward movement of the connecting rod 37 serves to actuate the bar or lever 45 which is moved out of the path of the platform so that the latter will be free to travel in a forward direction, actuated by the cables 43 which are being wound on the drum shaft 23. When the platform reaches the forward limit of its movement, the lip 42 will strike the obstructing member 41 of the bell crank 40 which is thus rocked against the tension of the spring 49, moving the stop member 39 out of the path of the hand lever 38, thus enabling the spring 36 to actuate the shipping lever to move the drum shaft longitudinally, thereby disengaging the clutch members 24, 25, and at the same time restoring the hand lever 38 to its initial position. At the same time the gravity catch 48 will engage the forward portion of a rack frame, thereby holding the platform B securely against retracting movement. The rack will now receive the material discharged from the hay loader on the rear end thereof between the hay ladder 22 and the load which has already been placed on the platform, thus enabling the second half of the load to be built up by the material discharged from the loader without necessity for shifting the load, as has been heretofore practised.

Having thus described the invention, what is claimed as new, is:—

1. In a device of the class described, a wheel supported frame, a platform longitudinally movable on said frame, means for forcibly moving the platform in one direction including a drum shaft, flexible connecting members, a clutch, a spring actuated shipping lever, a hand lever, and a rod connecting the hand lever with the shipping lever, said rod having an offset, a stop member to retain the platform at one end of its movement, said stop member comprising a bar having an arm provided with a sleeve engaging the offset portion of the connecting rod, a spring actuated bell crank having an offset that moves in the path of the hand lever when the latter is operated to actuate the shipping lever, said bell crank having also an obstructing member, and a lip associated with the platform to engage the obstructing member of the bell crank when the platform reaches the limit of its movement in one direction, thereby rocking the bell crank and releasing the hand lever.

2. In a device of the class described, a frame, including longitudinal sills and track members, a platform supported for longitudinal movement on the track members, means for forcibly propelling the platform in one direction, said means including a transmission clutch, and means for actuating the same, obstructing means to retain the platform in load receiving position at one limit of its movement, and means for simultaneously actuating the clutch device and releasing the obstructing member, said means including a sleeve associated with the obstructing member and a rod having an offset cam portion engaging the said sleeve.

In testimony whereof I affix my signature in presence of two witnesses.

HARRY S. WILLCOX.

Witnesses:
LOUIE E. WILLCOX,
ELSIE G. TAFFT.

---

Copies of this patent may be obtained for five cents each, by addressing the "Commissioner of Patents, Washington, D. C."